Dec. 27, 1966     M. RENOULT     3,293,914

MAGNITUDE MEASURING AND INDICATING APPARATUS

Filed Dec. 27, 1963     4 Sheets-Sheet 1

United States Patent Office 3,293,914
Patented Dec. 27, 1966

3,293,914
MAGNITUDE MEASURING AND
INDICATING APPARATUS
Marius Renoult, Paris, France, assignor, by mesne assignments, to Societe Noxa, Societe Anonyme de droit francais, Montreuil, France
Filed Dec. 27, 1963, Ser. No. 333,977
Claims priority, application France, Dec. 29, 1962, 920,166; Oct. 2, 1963, 949,351
11 Claims. (Cl. 73—304)

The present invention has for its object an apparatus for the measurement of a magnitude wherein, instead of reading the result of the measurement on a dial or on a rule, said result is given out numerically by electronic counting means so as to be read directly in the desired digital system.

The interest of such an apparatus resides in that the reading of the numeric result of a measurement is to be preferred to a reading on a dial scale by reason of the lack of accuracy of the latter which, in most cases, reduces considerably the accuracy to be expected from the measurement collecting means used.

As a matter of fact, a calculation which takes into account a number of parameters such as the separating capacity of the human eye, the distance at which the reading is performed, the illumination, shows that it is necessary to provide a dial having a minimum diameter of 240 mm. for a scale of 600 subdivisions. If said dial is intended for the measurement of the volume of a container having a capacity of 30,000 litres, each scale subdivision corresponds to 50 litres; in other words, the maximum accuracy to be expected is of such a magnitude.

It should be remarked that in addition to the lack of accuracy of such operations, the errors ascribable to parallaxis, to the thickness of the lines of the scale or of the movable reference mark, lead to an accuracy which depends subjectivtly on the operator. The errors ascribable to mechanical friction in a reading dial should also be mentioned.

Furthermore in the case of highly accurate instruments having a non-linear response, that is those wherein no linear relationship is obtained between the measured amount and the shifting of the movable reference mark such as the hand of the measuring dial, the scale subdivisions are often close for the larger amounts to be measured so that they are hardly legible and this requires the association with a correcting device adapted to provide equidistance between the dial scale subdivisions which are nearer the end of the dial scale wherein the reading possibilities are reduced to a minimum.

In order to cut out these drawbacks, it is possible to resort to indicating means such as the decimal counter of the disc or cylinder type commonly used in conventional mechanical calculating machines. However, in the case where the response of the measurement collector is not linear, it is necessary to insert between the tapping off of the information and the indicating means therefor, a suitable correcting device.

It is furthermore necessary to remark that the frequency of response of mechanical counters, that is the number of elementary units which it is possible to count within the unit of time is much lower than that of indicating means including a luminous tube showing the information tapped off for instance by electronic counting means.

The present invention which takes the above remarks into account covers a magnitude measuring arrangement, which includes a component collecting the measurements and connected with a recording component giving out the results and provided on the one hand with a signal carrier driven by a mechanism connected with the measurement collecting component so as to adjust the speed of progression of said signal carrier in front of a head reading said signals and also with counting means and on the other hand with means showing the results, which means are designed so as to give out the number of signals thus counted, the interval between two successive signals on the signal carrier being selected preferably through experimentation in a manner such that their reading may correspond to each of the successive units of the magnitude to be measured.

Said arrangement allows in particular through the use of a signal carrier, on which the signals are spaced in accordance with a suitable law, on the one hand, a correction of the non-linearity of the response of the measurement collector and, on the other hand, and possibly together with said correction, a direct translation into the desired unit of the magnitude to be measured, of the information tapped off the measurement collector and measured in units of a magnitude of a different kind which is bound to the first magnitude by a predetermined law, such for instance as that binding the height of the liquid carried in a container of any shape whatever to its volume.

Furthermore, it should be remarked that certain signal recording carriers such as magnetic tapes or disc-shaped supports allow recording on a predetermined length of the recording track, a very large number of signals adapted to be detected, which cuts out completely the drawbacks ascribable to the necessarily limited size of reading dials.

Of course the invention is applicable to measurement collectors resorting to the so-called elongation method, starting from an inoperative position such as a zero point but since the invention has more particularly for its object the obtention of a very high accuracy, it is preferable to resort to a measurement collector operating in accordance with the so-called zero analogic method.

Again with a view to obtaining a maximum accuracy of measurement, and in the case where the arrangement is of the type resorting to the measurement of an intermediate magnitude bound to the magnitude to be measured by a predetermined law, said arrangement is provided with means for the automatic return to zero of the signal carrier, which means are designed so as to substitute for the intermediate magnitude, during the time required for the return to zero, a magnitude of the same nature but of a value such that it corresponds to the position of the signal carrier for which the indicating means are on the zero scale subdivision, after which said substitution is cut out when said zeroizing stage of the operation is at an end.

The invention will be clearly understood, upon reading of the following description of a number of embodiments thereof which are illustrated in the accompanying drawings given by way of examples and wherein:

FIG. 7 is a block diagram of a return to zero arrangement adapted for use with the arrangement illustrated in FIG. 4, FIG. 8 is a block diagram of an arrangement incorporating the invention and adapted for the execution of weighing operations, FIG. 9 illustrates a fraction of a magnetic tape.

Figure 1:
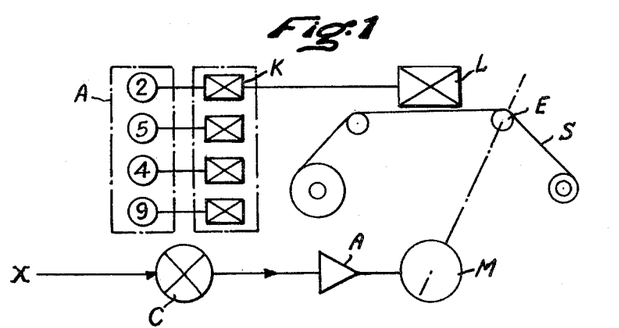
FIG. 1 is a block diagram illustrating the principle underlying the invention.

Turning to FIG. 1, the arrangement is illustrated diagrammatically in a highly general manner and it includes means for tapping off information at C, said means being designed so as to produce, for a measured amount X, a signal which is preferably applied through the agency of an amplifier A, to the arrangement controlling the motor M coupled with the driving mechanism E of the signal carrier S which, in the example illustrated, is constituted by a magnetic tape.

The arrangement C is designed so as to produce a signal capable of causing the motor M to rotate by a number of revolutions proportional to the magnitude measured or bound to said magnitude by a predetermined law.

The signal carrier moves under the action of the motor M, in front of the reading means L provided for said signals and connected with the arrangement for counting the signals illustrated at K and coupled in its turn with the indicating arrangement A, these two latter arrangements being well-known per se, for instance in the field of electronic calculating machines.

The signals are recorded on their carrier S, preferably in an experimental manner, by applying to the measurement collector known amounts of the magnitude to be measured and by recording a signal for each of the successive elementary units to be measured.

Said method allows obtaining a very high accuracy of measurement and it is to be remarked that it takes into account automatically any possible lack of linearity in the response of the collector.

It is however possible, when a very high accuracy is not required, to proceed by copying in the case of apparatus executed in mass production and capable of operating under identical conditions, for instance for gauging containers of the same shape and size.

The arrangement according to the invention allows also indicating a magnitude V the nature of which differs from that of X, but is bound to X by a predetermined relationship.

FIGS. 2, 3, 4 and 8 illustrate said possibility as applied to the case of means for gauging a container.

Figure 2:
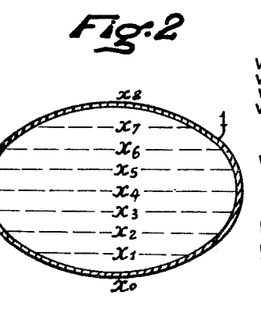
FIG. 2 is a sectional view of a container having an elliptic outline.

FIG. 2 is a cross-sectional view of a container 1 the cross-section of which is elliptic and the drawing shows a succession of equidistant levels X0, X1, X2 . . . X8.

Figure 3:
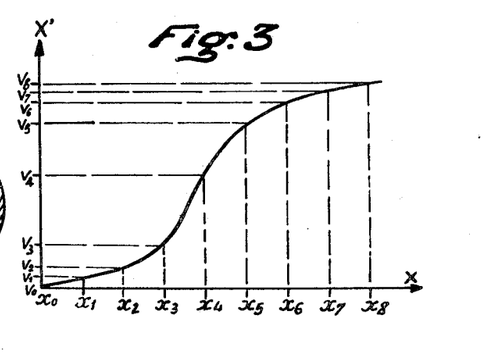
FIG. 3 is a graph illustrating the modification of the contents of the container as a function of the height of the liquid in the latter.

FIG. 3 illustrates the curve corresponding to the law of modification $V=f(X)$ of the contents of the container 1 which contents are drawn as ordinates at V0, V1, V2 . . . V8 for said different above levels which are drawn as abscissae.

Figure 4:
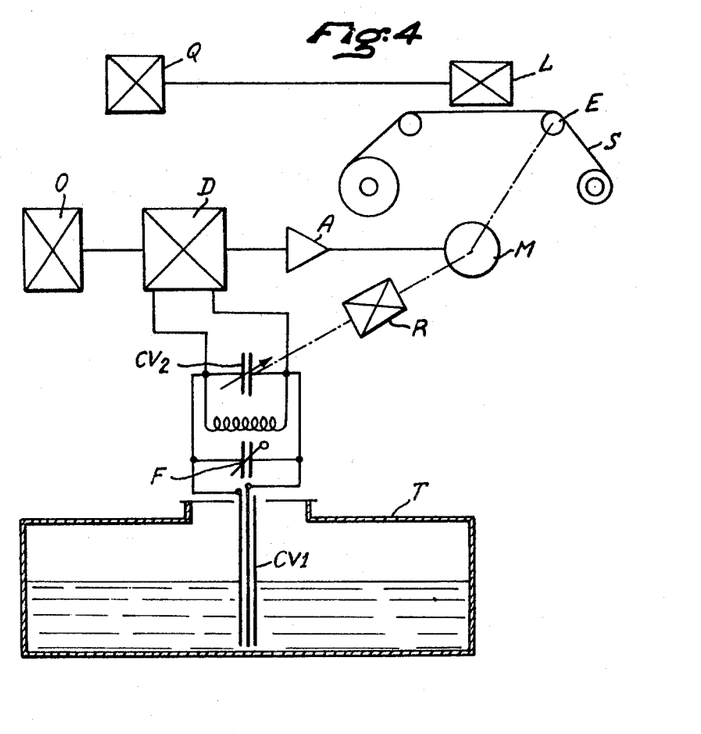
FIG. 4 is a diagram of an apparatus according to the invention designed with a view to measuring the volume of liquid in such a container.

In FIG. 4, the gauging means illustrated diagrammatically are those of FIG. 1 wherein the measurement collector is constituted by a rod carrying an immersed condenser CV1. Said arrangement is based on the analogic zero method and it includes an oscillator O provided with a pilot quartz oscillating at a predetermined frequency. Said oscillator is connected with a linear discriminator D in the circuit of which are inserted in parallel the gauging condenser CV1 immersed in the container T and the variable condenser CV2 in accordance with a diagram disclosed in detail with reference to FIGS. 5 and 6.

The variable condenser CV2 is driven by the motor M through the speed reducing means R.

The discriminator is designed so as to supply at its output a zero voltage when it is tuned to the frequency of the oscillator. Said tuning is obtained at the start through the adjustable condenser F for a zero height of liquid inside the container and for the positioning of the variable condenser CV2 corresponding to a maximum capacity.

When the level of the liquid rises inside the container carrying the capacity CV1, the value of the reactance $1/C\omega$ where C designates the capacity of the condenser and $\omega$ the period of the circuit, varies linearily by reason of the variations of the permittivity of the dielectric constituted by the liquid. The discriminator D is then out of tune and a D.C. voltage appearing at its output terminals is applied through the amplifier A to the motor M which drives simultaneously the movable plate of the condenser CV2 and the magnetic tape in the direction corresponding to the polarity of said voltage. The connections are such that the motor drives the condenser CV2 in a direction such that the condensers have a total capacity $CV1+CV2=$constant, said constant defining the tuned frequency of the discriminator.

The rotation of the motor continues until the variation in capacity of the variable condenser becomes equal to that of the capacity of the gauging condenser defined by the varying level of the liquid whereby said variation is compensated and the initial tuning is restored, the D.C. voltage being consequently cut out across the terminals of the discriminator so that the motor stops.

During said stage, the tape moves proportionally with the height of the liquid and each of its points corresponds to a predetermined level of said liquid inside the container.

As described hereinabove, the tape carries for each unit of length a number of signals which is proportional to the volume of the corresponding section of the container, but it may also carry a number of pulses which is proportional to the height of the liquid. It is apparent that the signals counted and stored in the counting and indicating system designated as a whole by Q, correspond between the moments $t1$ and $t0$ to the volume of the section of the container inside which the level has been shifted between said two moments. The volume given out at each moment, corresponds to the total volume contained inside the container T with the accuracy corresponding to the elementary selected unit defined between two successive signals on the tape.

In FIG. 9, is illustrated the magnetic tape S on which are shown diagrammatically the signals S0, S1, S2 . . . Sn which correspond each to successive elementary units of the volume to be measured and which have been recorded experimentally on the tape after positioning of gauging means over container T.

In the preceding example, it has been assumed that the measurement collector provided a linear response, that is that the number of revolutions executed by the motor was proportional to the difference in level recorded. It has also been assumed that the magnetic tape has progressed by a length proportional to the number of revolutions of the motor and in the same ratio whatever may be its elongation. In other words, the total response of the apparatus between the tapping off of the level measurement and the tape, has been assumed to be linear; this means that the tape progresses at each measurement by a lenthg proportional to the difference in level which has been recorded.

Obviously however and assuming that the signals have been recorded experimentally after positioning of the gauging means on the container, it is irrelevant that a factor of non-proportionality is introduced through one of the components of the whole system; as a matter of fact, the measurement of a same level will always produce a same elongation of the tape, that is the passage of the same number of signals under the reading means.

Figure 5:
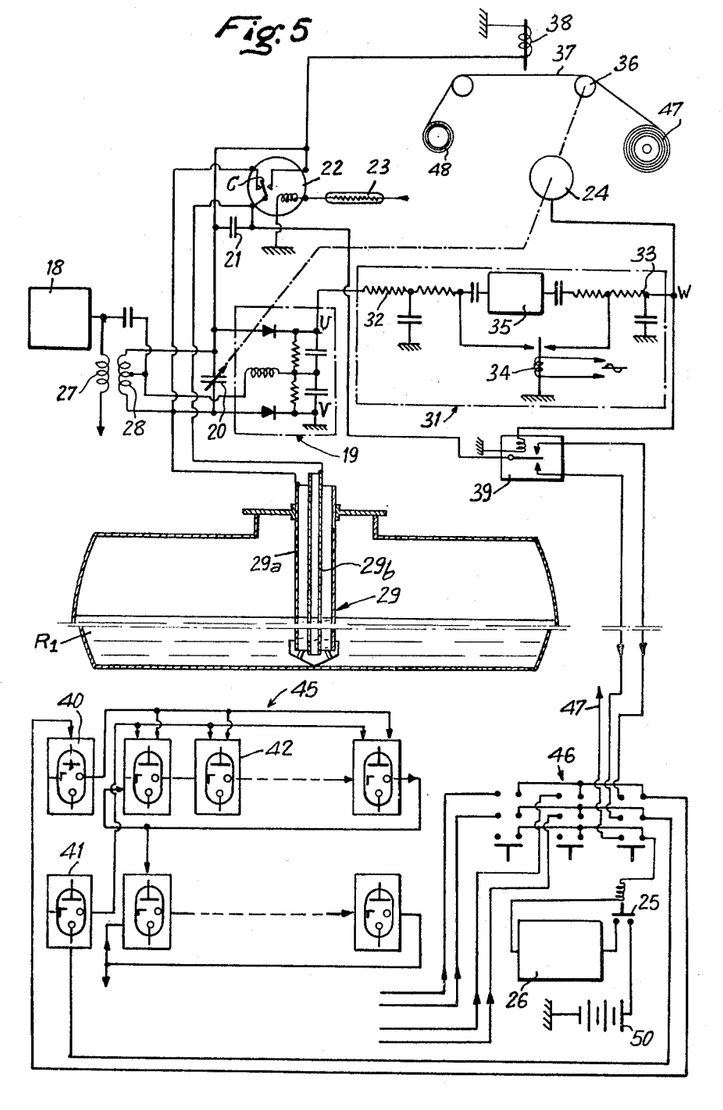
FIG. 5 is a detailed illustration of a preferred embodiment of a measurement collector.

In FIG. 5, the arrangement includes a single pulse counting and counting back means indicating the results and illustrated generally at 45, fed by the gauging apparatus of three containers R1, R2, R3 with which they may be connected by the switch 46. Only the gauging apparatus for the container R1 has been illustrated.

Said apparatus includes a gauging condenser or collector 29 provided with two tubular coaxial plates 29a, 29b extending substantially throughout the height of the container R1 and designed in such a manner such that the liquid may freely fill the space between the two plates.

The condenser 29 is inserted in the tuning circuit of a discriminator 19 including coupled induction coils 27, 28.

A variable condenser 20 is inserted in the tuning circuit in parallel with the condenser 29.

An oscillator 18 is coupled with the frequency discriminator 19 in a manner such that a D.C. voltage is formed in the frequency discriminator between its output terminals U, V, when the frequency of the tuning circuit differs from the frequency selected for the initial tuning or tuning frequency of the oscillator 18.

A voltage amplifier designated generally by the reference number 31 is connected across the output terminals of the frequency discriminator and feeds with a D.C. voltage, the electric motor 24. It includes in particular, a D.C. modulator 34, low-pass filters 32, 33, an A.C. amplifier 35 and an output terminal W connected with the motor 24 in the case of a linear servo-mechanism.

The motor is mechanically connected through a suitable reducing gear, on the one hand, with the movable plate of the variable condenser 20 and, on the other hand, with the mechanism 36 driving a magnetic recording tape 37 which is wound in the usual manner around the spools 47-48 and moves in front of a reading head 38.

The arrangement includes furthermore a biased relay 39 subjected to the polarity of the current fed at the output end W of the amplifier 31 and adapted to direct the pulses detected by the head 38, either into the counting circuit, or into the counting back circuit, according to the direction of rotation imparted to the motor 24 by the current fed by the amplifier, that is, according as to whether the apparatus has recorded an increase or a decrease in the level of liquid.

The arrangement includes furthermore a relay 22 delayed by a thermic resistance 23 and adapted to replace, in its inoperative position the condenser 29 by a reference condenser 21 of a capacity equal to that of the former condenser for a completely empty condition of the container and to render inoperative for the same position, the circuit of the reading head 38, whereas for the operative position reached by said relay at the end of the delay produced by the thermic resistance 23, the condenser 29 replaces the condenser 21 and establishes a suitable connection between the reading head 38 and the counting and counting back means through the agency of the biased relay 39.

Furthermore, the feeding means 26 energized by the contact-maker 25 include an output wire 47 connected in a conventional manner with the various electronic tubes or semi-conductive crystals forming part of the various circuits of the complete apparatus, such as the oscillator 18 and the A.C. amplifier 35.

The operation of the arrangement is as follows:

The switch 46 being previously set in the position for which it ensures connection of the container R1, the arrangement is connected with the supply of energy 50 through operation of the contact-maker 25 in a manner such that suitable voltages are applied to the different circuits. The oscillator 18 starts and feeds through the coupled windings 27 and 28, the discriminator 19 which is normally tuned to the frequency of the oscillator 18 by the reference condenser 21, the capacity of which is equal to that of the gauging condenser or collector 29 when the space between the electrodes 29a, 29b is empty. The condenser 21 is inserted in parallel with the variable condenser 20 as provided by the contact C of the relay 22; for the minimum value of the condenser 20 corresponding to the zero value on the tape, the tuning is obtained for the discriminator 19 whereas otherwise, the discriminator 19 is out of tune and a D.C. voltage appears across the terminals U and V. Said voltage is amplified by the amplifier 31 and is applied, with a sign which corresponds to the direction of the shift of frequency, to the D.C. motor 24 which, through a suitable reducing gear, not shown, drives the movable plate of the variable condenser 20 correspondingly so as to tune again the discriminator 19 to the unvarying frequency of the oscillator 18.

The amplifier 31 operates with D.C. and its drift is small. It includes a modulator 34 for D.C. voltage, low-pass filters 32, 33 and an A.C. amplifier 35.

It is apparent that the zero of the apparatus has been restored, during a period corresponding to that of the response of the servo-mechanism by substituting for the measurement collector 29 a capacity 21 equal to the actual residual capacity of the collector 29 when empty. The tape has been unwound in front of the electronic head 38 but its circuit, during such a period, is not yet closed and consequently no pulse has been recorded.

During the following stage of operation, the thermic resistance 23 feeds a sufficient voltage to the winding of the relay 22 the movable armature enters its operative position and cuts off the condenser 21 while inserting in parallel with the variable condenser 20, the collector 29 the value of which at the moment of the measurement, depends on the height of liquid in the container R1. The discriminator is out of tune and a D.C. voltage appears across U and V. Said voltage depends as to value and sign on the difference between the frequencies and on its direction with reference to the average frequency; it is amplified as described hereinabove and controls the rotation of the motor 24 in a suitable direction. The latter drives simultaneously the movable plate of the condenser 20 and the driving arrangement for the magnetic tape 36. It should be remarked that the values of the capacities 29 and 20 vary in opposite directions and the following results may be written out:

$$C_{29} \text{ total} + C_{20} \text{ residual} = \text{constant}$$
$$C_{29} \text{ residual} = C_{20} \text{ residual}$$

During its rotation and in order to tune again the discriminator 19, the motor 24 has shifted the tape in front of the reading head 38 by a length which is in a linear relationship with the height of the liquid. The tape has received experimentally a number of magnetic signals or "pips" in a manner such that the spacing between two consecutive signals corresponds, for each level considered, to the elementary chosen unit of volume. The electronic reading head 38 thus supplies at each passage of a local magnetic pulse in front of said head, a pulse the amplitude and shape of which depend on the intensity of the magnetization of the tape and of the characteristics of the reading circuit. The motor 24 revolves in a direction depending on the sign of the voltage at the point W, which serves for holding the movable armature of the biased relay 39 in a position defined by said sign so as to feed the pulses to be counted in a direction corresponding to addition or subtraction according to the case.

Assuming the system in a position of equilibrium, and supposing that the surface of the liquid inside the container sinks, that is that the volume decreases, a reverse procedure drives similarly the tape in the reverse direction so as to tune again the discriminator, while the sign of the voltage at W is reversed and the movable armature 39 engages the other contact feeding the pulses from the reading means towards a counting back circuit so as subtract them from the preceding result the indication of which has remained in position. At the output of the gauging means, pulses to be counted or counted back are available and are shaped in the circuits 40 and 41 before feeding the double input ring 42 (for counting and counting back) recording the digits of the first order. There are as many rings as digit orders to be considered. The diagram illustrates in a non-limiting manner, rings which are executed with thyratrons having cold cathodes.

Of course, if it is desired to resort to a non-linear servo-mechanism, the voltage fed at W would be applied to a preferably biased relay so as to ensure the switching of a motor having an independent energization.

In the above arrangement, the measurement collector is provided, with a view to cutting out any possible source of error, with a pilot oscillator associated with a frequency discriminator in a wiring diagram restorting to the so-called zero analogic measuring method. In particular, the frequency discriminator has been selected by reason of the excellent linearity of response which may be obtained through its agency. On the other hand, the measurement collector such as the gauging condenser, is connected so as to act on the tuning of the discriminator and no longer on the frequency of the oscillator with a view to retaining a possibility of controlling the latter. Said oscillator forms thus a reference frequency of a very high stability which may serve as a reference for accurate measurements.

Figure 6:
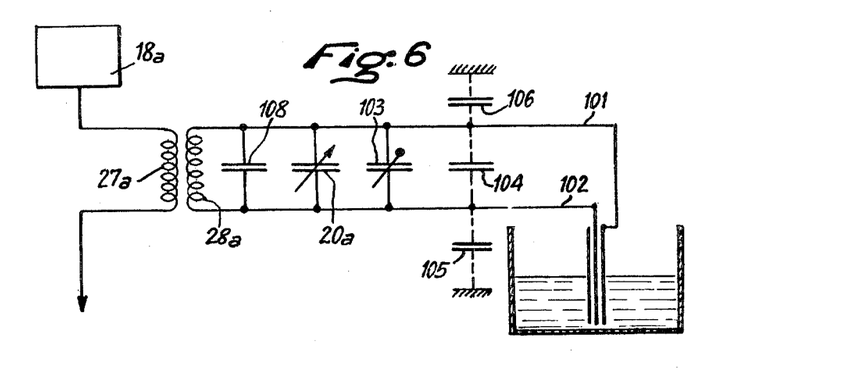
FIG. 6 is a wiring diagram of a tuning circuit adapted for operation with a measurement collector of the type illustrated in FIG. 5.

In FIG. 6, the reference numbers of FIGURE 5 have been taken up again and have received an index $a$ for the designation of similar parts.

In said figure, the circuit of the measuring counter includes a coil 28a coupled with the coil 27a, which is connected with the oscillator 18a.

The coil 28a is connected with the plates of the condenser collecting the measurements 29a, said connection being provided by the wires 101 and 102 across which are inserted the variable condenser 20a coupled with the motor, which is not illustrated, driving the magnetic tape and the condenser 108 having a large capacity of a magnitude of a few ten thousands picofarads and adapted to make the modifications in the capacity of the variable condenser proportionally very small during the measurements while the circuit operates in the desired portion of its response curve. There is added an adjustable condenser 103 which allows executing the tuning of the circuit taking into account the parasitic capacities which may arise, either between the wires 101–102, or between each of the latter and the ground.

Said parasitic capacities are shown symbolically in the first case as a capacity 104 and as concerns the latter by capacities 105 and 106.

Mere examination of the wiring diagram shows that these different parasitic capacities are in parallel with the condensers 20a and 108, in other words they reduce in particular the value which is to be given to the condenser 108.

The capacity for which the circuit is tuned, that is its total capacity, is in practice of a magnitude of a few ten thousands picofarads per meter of line, whereas the capacity of the dipper 29 is of the magnitude of a few hundred picofarads. The parasitic capacities 104, 105, 106 are comparatively low and their magnitude is for instance equal to hundred picofarads for each meter of line. This shows, on the one hand, that the arrangement can operate with considerable lengths of line conecting the dipper 29 with the measuring means while the parasitic capacities ascribable to said line, do not disturb the proper balance of the whole system and allow in fact, in contradistinction, a reduction of the value of the condenser 108.

In FIG. 7, the arrangement for returning to zero is applied to a measuring arrangement of the same type as that illustrated in FIG. 4 considered as a whole, that is independently of the nature of the magnitude to be measured. In the latter, the information receiving means or comparator is shown symbolically by the element C1 whereas the variable condenser or measurement-transmitting element is shown symbolically by the translator T1. Said arrangement is inserted in the circuit before each measurement in a manner such that the tape S may be returned into its starting position which corresponds to the zero on the indicating means.

This in obtained by substituting for the intermediate magnitude to be measured G, a magnitude Go of the same nature, but of a value such that it corresponds to the starting position of the tape. Said substitution is obtained through a relay 152 of which the winding 156 is fed through a thermic delaying resistance 151. Furthermore, during the return to 0, no information is sent into the counting arrangement as provided by a suitable connection between the reading means and the indicating arrangement, which is obtained through the operative contact-piece 154 of the relay 152. Obviously the substituted magnitude Go is subjected to the same conditions as the true magnitude G, for instance as concerns temperature.

The operation is as follows, the measurement includes two periods:

Gauging at the start through Go
Measurement of G

*Gauging*

The tape remains in the position corresponding to the preceding measurement, the magnitude Go is connected through a contact blade 155 and the inoperative contact-piece 153 of the relay 152 with the comparator C1. When depressing the measuring switch which is not illustrated, the voltage is applied to the different circuits and the comparator produces then an error voltage corresponding to the difference between the value of Go and the value supplied by the translator T which has remained in the position corresponding to the preceding measurement. The servo-mechanism restores the balance and the motor drives at the same time the tape which stops in its starting position with an error which corresponds to the threshold at the starting of the motor, which error may in fact be corrected. The electromagnetic reading means L are, during this stage of operation, out off the counting circuit.

*Measurement*

At the end of a period defined by the value of the thermic resistance 151, the delaying circuit operates and the current which flows through the winding 156 of the relay 152 brings the blade 155 into contacting relationship with the operative contact-piece 154. The magnitude G detected by the measurement collector 157 to which it is fed, forms then a substitute for the magnitude G at the input of the comparing means C1. The tape is driven through the same procedure as precedingly, but in the opposite direction so as to stop in a position corresponding to the value of G, whereas the pulses fed by the reading means are transmitted by the contact-piece 154 and the blade 155, into the counting and indicating system Q.

It should be remarked that such an arrangement for returning to zero may allow, if required, serving, through a suitable switch and through the same arrangement, several similar containers provided each with its measurement collector such as 158, 159.

In FIG. 8, the arrangement according to the invention is applied more particularly to the measurement of a weight, while the price of the weighed goods is simultaneously calculated.

The weight measuring means are illustrated in FIG. 8 merely as a magnetic tape 201, but obviously it is of the general type described hereinabove. It may, in particular be considered as being of the type described in FIG. 5, the immersed gauging condenser being replaced by a variable condenser of which the movable plate is, for instance, rigid with the rocking spindle of the scale.

The pulses, the number of which corresponds to the weight to be measured, are fed into the counting means 202 which feeds the information into the recording means 203 from which they are simultaneously sent into the indicating means 204 and into the calculating system 205 where it is received by the "multiplier" means.

Furthermore, the arrangement includes also means indicating a unitary price, for instance a decimal keyboard 206 out of which said unitary price is fed into the calculating system where it is received by the "multiplicand" station.

The total price defined by the calculating means is fed into the indicating means 207 and possibly into an arrangement 208 for printing the check ticket.

The arrangement may be usefully associated with a connection 209 provided between the keyboard 206 and the arrangement for recording the weight 203 in a manner such that the latter cannot be recorded or fed into the calculating means as long as the unitary price has not been applied on the keyboard.

What is claimed is:

1. An arrangement for measuring a magnitude, comprising means defining an intermediate magnitude bound to the magnitude to be measured by a predetermined law, a reading head, a signal carrier, the signals carried by which are spaced by amounts corresponding to units of the magnitude to be measured, means driving the signal carrier across the reading head and controlled by the magnitude defining means, a counting mechanism controlled by the reading means, means indicating the number of signals counted by the counting mechanism and corresponding to the measurement of the magnitude to be measured as defined by the first-mentioned means and an arrangement for returning automatically to zero the signal carrier including means adapted to substitute for said magnitude defining means in the control of the driving means, a magnitude of the same nature as the intermediate magnitude and the value of which corresponds to the position of the signal carrier for which the indicating means are in their zero position and means returning the driving means under the control of the magnitude defining means when the return to zero of the indicating means has been obtained.

2. An arrangement for measuring a magnitude, comprising a variable condenser the capacity of which is bound to the magnitude to be measured by a predetermined law, a condenser of a large capacity connected in parallel with said variable capacity, a circuit fed by said condensers, a recording head, a signal carrier the signals carried by which are spaced by amounts corresponding to units of the magnitude to be measured, means driving the signal carrier across the reading head and controlled by the condenser circuit, a counting mechanism controlled by the reading means, means indicating the number of signals counted by the counting mechanism and corresponding to the measurement of the magnitude as measured by the variable capacity, an arrangement for returning automatically to zero the signal carrier including means adapted to substitute for the condenser circuit in the control of the driving means another condenser the capacity of which is such that it returns the signal carrier into a position for which the indicating means are in their zero position and means returning the driving means under the control of the condenser circuit when the return to zero of the indicating means has been obtained.

3. An arrangement for measuring a magnitude, comprising a variable condenser the capacity of which is bound to the magnitude to be measured by a predetermined law, a condenser of a large capacity connected in parallel with said variable capacity, an adjustable condenser inserted in parallel with said two condensers, a circuit fed by said condensers, a recording head, a signal carrier the signals carried by which are spaced by amounts corresponding to units of the magnitude to be measured, means driving the signal carrier across the reading head and controlled by the condenser circuit, a counting mechanism controlled by the reading means, means indicating the number of signals counted by the counting mechanism and corresponding to the measurement of the magnitude as measured by the variable capacity, an arrangement for returning automatically to zero the signal carrier including means adapted to substitute for the condenser circuit in the control of the driving means another condenser the capacity of which is such that it returns the signal carrier into a position for which the indicating means are in their zero position and means returning the driving means under the control of the condenser circuit when the return to zero of the indicating means has been obtained.

4. An arrangement for measuring the volume of a liquid in a container comprising a level-defining condenser extending throughout the depth of the container, and including two plates subjected to the action of the liquid in the container, a frequency discriminator tuned to a predetermined frequency, a circuit connecting the level-defining condenser with the frequency discriminator, a variable condenser inserted in parallel with the frequency discriminator in said circuit, a pilot oscillator tuned to an unvarying frequency equal to the tuning frequency of the discriminator, means whereby any detuning of the discriminator produces a D.C. voltage, an electric motor controlled by said D.C. voltage, correcting means controlled by the motor and returning the frequency of the discriminator to its predetermined frequency, a signal recording strip driven by the motor whereon the spacing of two successive signals corresponds for any level of the liquid in the container to a predetermined unit of volume, means reading the signals on the strip, a signal counting and counting back mechanism controlled by the reading means and means indicating said results obtained by last-mentioned mechanism.

5. An arrangement for measuring the volume of a liquid in a container comprising a level-defining condenser extending throughout the depth of the container, and including two plates subjected to the action of the liquid in the container, a frequency discriminator tuned to a predetermined frequency, a circuit connecting the level-defining condenser with the frequency discriminator, a variable condenser inserted in parallel with the frequency discriminator in said circuit, a pilot oscillator tuned to an unvarying frequency equal to the tuning frequency of the discriminator, means whereby any detuning of the discriminator produces a D.C. voltage, at the output of the discriminator a D.C. motor, a voltage amplifier connecting the output of the discriminator with the motor, correcting means controlled by the motor and returning the frequency of the discriminator to its predetermined frequency, a signal recording strip driven by the motor whereon the spacing of two successive signals corresponds for any level of the liquid in the container to a predetermined unit of volume, means reading the signals on the strip, a signal counting and counting back mechanism controlled by the reading means and means indicating said results obtained by last-mentioned mechanism.

6. An arrangement for measuring the volume of a liquid in a container comprising a level-defining condenser extending throughout the depth of the container, and including two plates subjected to the action of the liquid in the container, a frequency discriminator tuned to a predetermined frequency, a circuit connecting the level-defining condenser with the frequency discriminator, a variable condenser inserted in parallel with the frequency discriminator in said circuit, a pilot oscillator tuned to an unvarying frequency equal to the tuning frequency of the discriminator, means whereby any detuning of the discriminator produces a D.C. voltage, at the output of the discriminator, an electric motor, an independent circuit feeding same, a voltage amplifier fed by the motor, a relay fed by said amplifier and controlling the operation of said independent circuit, correcting means controlled by the motor and returning the frequency of the discriminator to its predetermined frequency, a signal recording strip driven by the motor whereon the spacing of two successive signals corresponds for any level of the liquid in the container to a predetermined unit of volume, means reading the signals on the strip, a signal counting and counting back mechanism controlled by the reading means and means indicating said results obtained by last-mentioned mechanism.

7. An arrangement for measuring the volume of a liquid in a container comprising a level-defining condenser extending throughout the depth of the container, and including two plates subjected to the action of the liquid in the container, a frequency discriminator tuned to a predetermined frequency, a circuit connecting the level-defining condenser with the frequency discriminator, a variable condenser inserted in parallel with the frequency discriminator in said circuit, a pilot oscillator tuned to an unvarying frequency equal to the tuning frequency of the discriminator, means whereby any detuning of the discriminator produces a D.C. voltage, an electric motor controlled by said D.C. voltage, correcting means controlled by the motor and returning the frequency of the discriminator to its predetermined frequency, a signal recording strip driven by the motor whereon the spacing of two successive signals corresponds for any level of the liquid in the container to a predetermined unit of volume, means reading the signals on the strip, a signal counting and counting back mechanism controlled by the reading means and means indicating said results obtained by last-mentioned mechanism, a gauging condenser, the capacity of which is equal to that of the level-defining condenser when the container is empty and means for substituting said gauging condenser for the level defining condenser in the circuit during the return to zero of the arrangement.

8. An arrangement for measuring the volume of a liquid in a container comprising a level-defining condenser extending throughout the depth of the container, and including two plates subjected to the action of the liquid in the container, a frequency discriminator tuned to a predetermined frequency, a circuit connecting the level-defining condenser with the frequency discriminator, a variable condenser inserted in parallel with the frequency discriminator in said circuit, a pilot oscillator tuned to an unvarying frequency equal to the tuning frequency of the discriminator, means whereby any detuning of the discriminator produces a D.C. voltage, an electric motor controlled by said D.C. voltage, correcting means controlled by the motor and returning the frequency of the discriminator to its predetermined frequency, a signal recording strip driven by the motor whereon the spacing of two successive signals corresponds for any level of the liquid in the container to a predetermined unit of volume, means reading the signals on the strip, a signal counting and counting back mechanism controlled by the reading means, means indicating said results obtained by last-mentioned mechanism, a delayed contact-making relay inserted in the circuit, a gauging reference condenser the capacity of which is equal to that of the first mentioned condenser for empty container conditions and adapted to be substituted for the level-defining condenser in the circuit under the action of said relay at the end of the delay until the arrangement has been returned to zero.

9. An arrangement for measuring a magnitude comprising means defining an intermediate magnitude bound to the magnitude to be measured by a predetermined law, a plurality of measuring apparatuses each comprising a reading head, a signal carrier, the signals carried by which are spaced by amounts corresponding to units of the magnitude to be measured, means driving the signal carrier across the reading head and controlled by the magnitude defining means, a counting mechanism controlled by the reading means, means selectively connecting operatively the counting mechanism with the reading means of the arrangement, means indicating the number of signals counted by the counting mechanism and corresponding to the measurement made in the arrangement the reading means of which have been thus connected, and an arrangement for returning automatically to zero the signal carrier including means adapted to substitute for said magnitude defining means in the control of the driving means, a magnitude of the same nature as the intermediate magnitude and the value of which corresponds to the position of the signal carrier for which the indicating means are in their zero position and means returning the driving means under the control of the magnitude defining means when the return to zero of the indicating means has been obtained.

10. An arrangement for measuring a magnitude as claimed in claim 1, wherein said signal support is a magnetic tape.

11. An arrangement for measuring a magnitude as claimed in claim 9, wherein said means defining an intermediate magnitude is a variable condenser.

References Cited by the Examiner
UNITED STATES PATENTS

| | | | |
|---|---|---|---|
| 2,651,940 | 9/1953 | Kline | 73—304 |
| 2,668,875 | 9/1954 | Boisblanc | 73—304 |
| 2,770,145 | 11/1956 | Stibtz | 235—197 |
| 2,934,258 | 6/1960 | Shawhan | 73—304 X |
| 2,948,467 | 8/1960 | Muffly | 235—197 |
| 3,017,111 | 1/1962 | Bellamy | 340—347 |

LOUIS R. PRINCE, *Primary Examiner.*

S. CLEMENT SWISHER, *Assistant Examiner.*

UNITED STATES PATENT OFFICE
CERTIFICATE OF CORRECTION

Patent No. 3,293,914                      December 27, 1966

Marius Renoult

It is hereby certified that error appears in the above numbered patent requiring correction and that the said Letters Patent should read as corrected below.

Column 4, line 56, for "lenthg" read -- length --; column 7, line 4, for "restorting" read -- resorting --; line 53, for "conecting" read -- connecting --; line 71, for "in" read -- is --; column 8, line 30, for "out" read -- cut --.

Signed and sealed this 26th day of September 1967.

(SEAL)
Attest:

ERNEST W. SWIDER
Attesting Officer

EDWARD J. BRENNER
Commissioner of Patents